(12) United States Patent
Chen et al.

(10) Patent No.: US 11,614,805 B2
(45) Date of Patent: *Mar. 28, 2023

(54) JOYSTICK WITH LIGHT EMITTER AND OPTICAL SENSOR WITHIN INTERNAL CHAMBER

(71) Applicant: PixArt Imaging Inc., Hsin-Chu (TW)

(72) Inventors: Yi-Chung Chen, Hsin-Chu (TW); Chu-Hung Nien, Hsin-Chu (TW)

(73) Assignee: PixArt Imaging Inc., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/191,572

(22) Filed: Mar. 3, 2021

(65) Prior Publication Data

US 2021/0191533 A1 Jun. 24, 2021

Related U.S. Application Data

(63) Continuation of application No. 16/395,226, filed on Apr. 25, 2019, now Pat. No. 10,969,878, which is a continuation-in-part of application No. 15/681,415, filed on Aug. 20, 2017, now Pat. No. 10,372,155.

(51) Int. Cl.
*G06F 3/0338* (2013.01)
*G06F 3/03* (2006.01)
*G05G 9/047* (2006.01)

(52) U.S. Cl.
CPC .......... *G06F 3/0338* (2013.01); *G05G 9/047* (2013.01); *G06F 3/0308* (2013.01); *G05G 2009/04759* (2013.01)

(58) Field of Classification Search
CPC ...... G06F 3/0308; G06F 3/033; G06F 3/0338; G05G 9/047; G05G 2009/04759
See application file for complete search history.

(56) References Cited

U.S. PATENT DOCUMENTS

| | | |
|---|---|---|
| 3,644,972 A | 2/1972 | Evans |
| 6,300,940 B1 | 10/2001 | Ebina |
| 9,939,850 B2 | 4/2018 | Hoellwarth |
| 2001/0055001 A1 | 12/2001 | Sakamaki |
| 2003/0128194 A1 | 7/2003 | Pettersson |
| 2005/0062721 A1 | 3/2005 | Hsu |
| 2005/0275623 A1 | 12/2005 | Chadha |
| 2006/0079328 A1 | 4/2006 | Wang |
| 2007/0236692 A1 | 10/2007 | Schebesta |

(Continued)

FOREIGN PATENT DOCUMENTS

| | | |
|---|---|---|
| CN | 101135944 A | 3/2008 |
| CN | 101377915 A | 3/2009 |

(Continued)

*Primary Examiner* — Vijay Shankar
*Assistant Examiner* — Nathaniel P Brittingham
(74) *Attorney, Agent, or Firm* — Winston Hsu

(57) ABSTRACT

A joystick includes a first structural component, a second structural component, a light emitter, an optical sensor and a processor. The second structural component is assembled with the first structural component to form a chamber. The light emitter is disposed inside the chamber for illuminating one surface of the second structural component. The optical sensor is disposed inside the chamber for capturing the illuminated surface of the second structural component. The processor is electrically connected to the optical sensor and adapted to analyze an intensity distribution of the illuminated surface for determining if the joystick is obliquely pressed or laterally shifted in a relative manner.

12 Claims, 10 Drawing Sheets

(56) References Cited

U.S. PATENT DOCUMENTS

| | | |
|---|---|---|
| 2008/0001918 A1 | 1/2008 | Hsu |
| 2008/0016711 A1 | 1/2008 | Baebler |
| 2008/0192025 A1 | 8/2008 | Jaeger |
| 2009/0201031 A1 | 8/2009 | Morimoto |
| 2009/0211820 A1 | 8/2009 | Lin |
| 2010/0103140 A1 | 4/2010 | Hansson |
| 2010/0135534 A1 | 6/2010 | Weston |
| 2010/0286498 A1 | 11/2010 | Dacquay |
| 2011/0157056 A1 | 6/2011 | Karpfinger |
| 2011/0168874 A1 | 7/2011 | Phan Le |
| 2012/0001860 A1 | 1/2012 | Phan Le |
| 2012/0194457 A1 | 8/2012 | Cannon |
| 2015/0319821 A1 | 11/2015 | Yoshida |
| 2016/0361635 A1* | 12/2016 | Schmitz .................. A63F 13/22 |
| 2017/0038867 A1 | 2/2017 | Buckett |
| 2017/0153456 A1 | 6/2017 | Huang |
| 2017/0293371 A1 | 10/2017 | Yao |
| 2018/0059850 A1 | 3/2018 | Kerr |
| 2019/0056759 A1 | 2/2019 | Wang |
| 2022/0276405 A1 | 9/2022 | Watanabe |

FOREIGN PATENT DOCUMENTS

| | | |
|---|---|---|
| CN | 102279655 A | 12/2011 |
| CN | 104731310 A | 6/2015 |
| CN | 105051660 A | 11/2015 |
| CN | 106182154 A | 12/2016 |
| JP | 2000-148391 A | 5/2000 |
| KR | 10-2006-0092422 A | 8/2006 |
| TW | 200937262 | 9/2009 |
| WO | 2021/100261 A1 | 5/2021 |

\* cited by examiner

I1-1

I1-2

JOYSTICK WITH LIGHT EMITTER AND OPTICAL SENSOR WITHIN INTERNAL CHAMBER

CROSS REFERENCE TO RELATED APPLICATIONS

This application is a continuation application of U.S. patent application Ser. No. 16/395,226, filed on 2019 Apr. 25, which is a continuation in part of U.S. application Ser. No. 15/681,415, filed on 2017 Aug. 20.

BACKGROUND OF THE INVENTION

1. Field of the Invention

The present invention relates to a joystick, and more particularly, to a joystick capable of outputting different control commands resulted from edge pressing operation and laterally shifting operation.

2. Description of the Prior Art

A conventional mechanical joystick includes a sensor, a trackball, a lever arm and a handle. A user presses the handle to move the lever arm, the lever arm can be inclined and rotated via the trackball, and the sensor detects motion of the trackball to control a cursor signal output by the mechanical joystick. The handle is made by solid material and can be pushed and pulled to recline the lever arm for generating the cursor signal. While the mechanical joystick is reclined, the lever arm can be rotated or slanted towards specially designated directions, and the trackball recovers the lever arm via a spring. Therefore, the conventional mechanical joystick is operated by limited gestures due to the designated directions, and may easily result in mechanical fatigue by long-term usage. An advanced joystick may replace the lever arm by a resilient structure, and however the advanced joystick still cannot distinguish edge pressing operation from laterally shifting operation.

SUMMARY OF THE INVENTION

The present invention provides a joystick capable of outputting different control commands resulted from edge pressing operation and laterally shifting operation for solving above drawbacks.

According to the claimed invention, a joystick includes a first structural component, a second structural component, a light emitter, an optical sensor and a processor. The second structural component is assembled with the first structural component to form a chamber. The light emitter is disposed inside the chamber for illuminating one surface of the second structural component. The optical sensor is disposed inside the chamber for capturing the illuminated surface of the second structural component. The processor is electrically connected to the optical sensor and adapted to analyze an intensity distribution of the illuminated surface for determining if the joystick is obliquely pressed.

According to the claimed invention, a joystick includes a first structural component, a second structural component, an optical sensor and a processor. The second structural component is assembled with the first structural component to form a chamber, and an identification element is formed on the second structural component. The optical sensor is disposed inside the chamber and adapted to acquire a state of the identification element. The processor is electrically connected to the optical sensor and adapted to analyze the state of the identification element for generating a control signal. The first structural component and the second structural component are made by rigid material.

The joystick of the present invention can preset the luminous regions projected onto the illuminated surface, and analyze the intensity distribution of the illuminated surface, which can be affected by the distribution variation of the luminous regions, for determining whether the joystick is obliquely pressed or laterally shifted in the relative manner. Arrangement of the light emitter is predefined; the light emitter of the joystick not only can illuminate the identification elements therefore the optical sensor can capture the clear image about the identification spots, but also can project the luminous regions for distinguishing the laterally shifting operation from the obliquely pressing operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
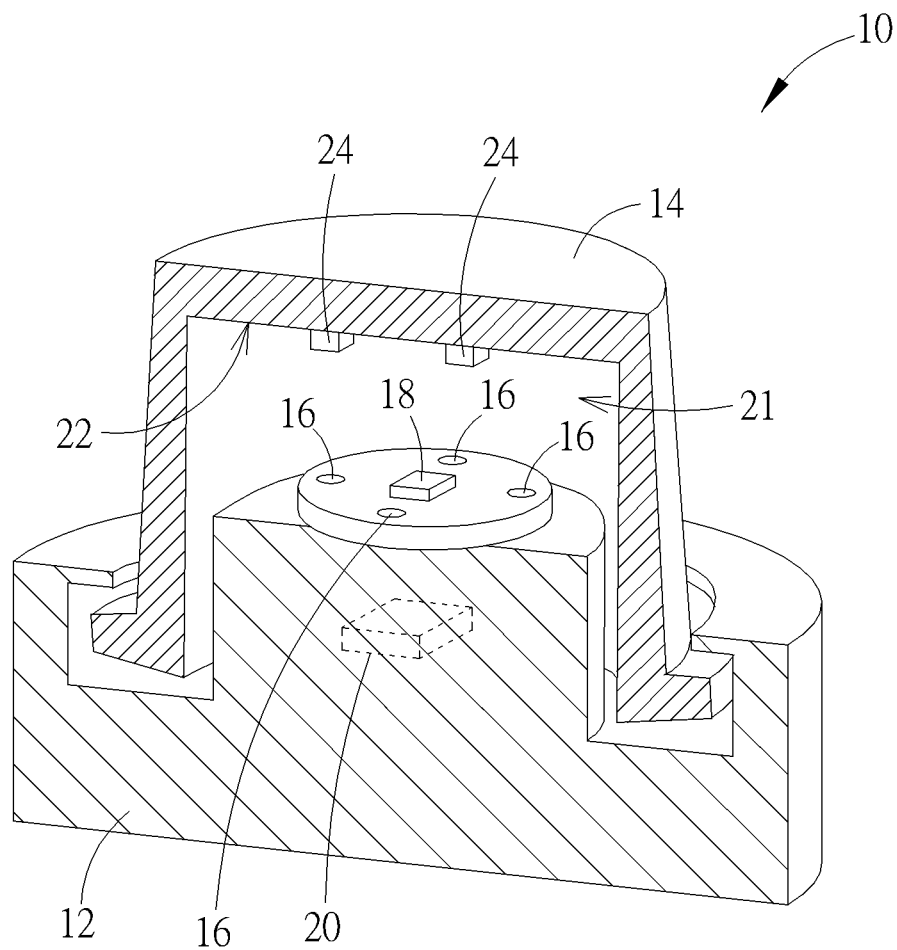
FIG. 1 is a diagram of a joystick according to a first embodiment of the present invention.
Figure 2:
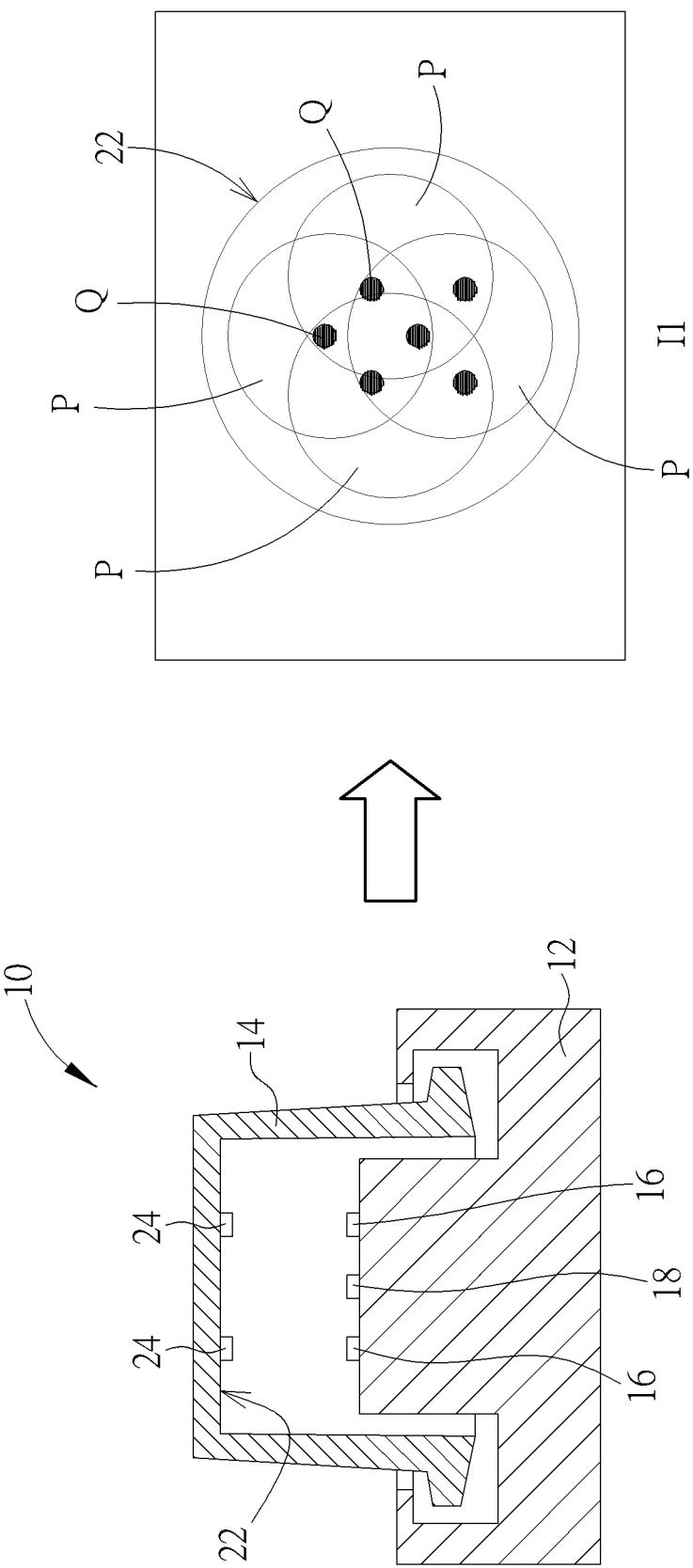
FIG. 2 is a diagram of the joystick in an initial operation mode according to the first embodiment of the present invention.
Figure 3:
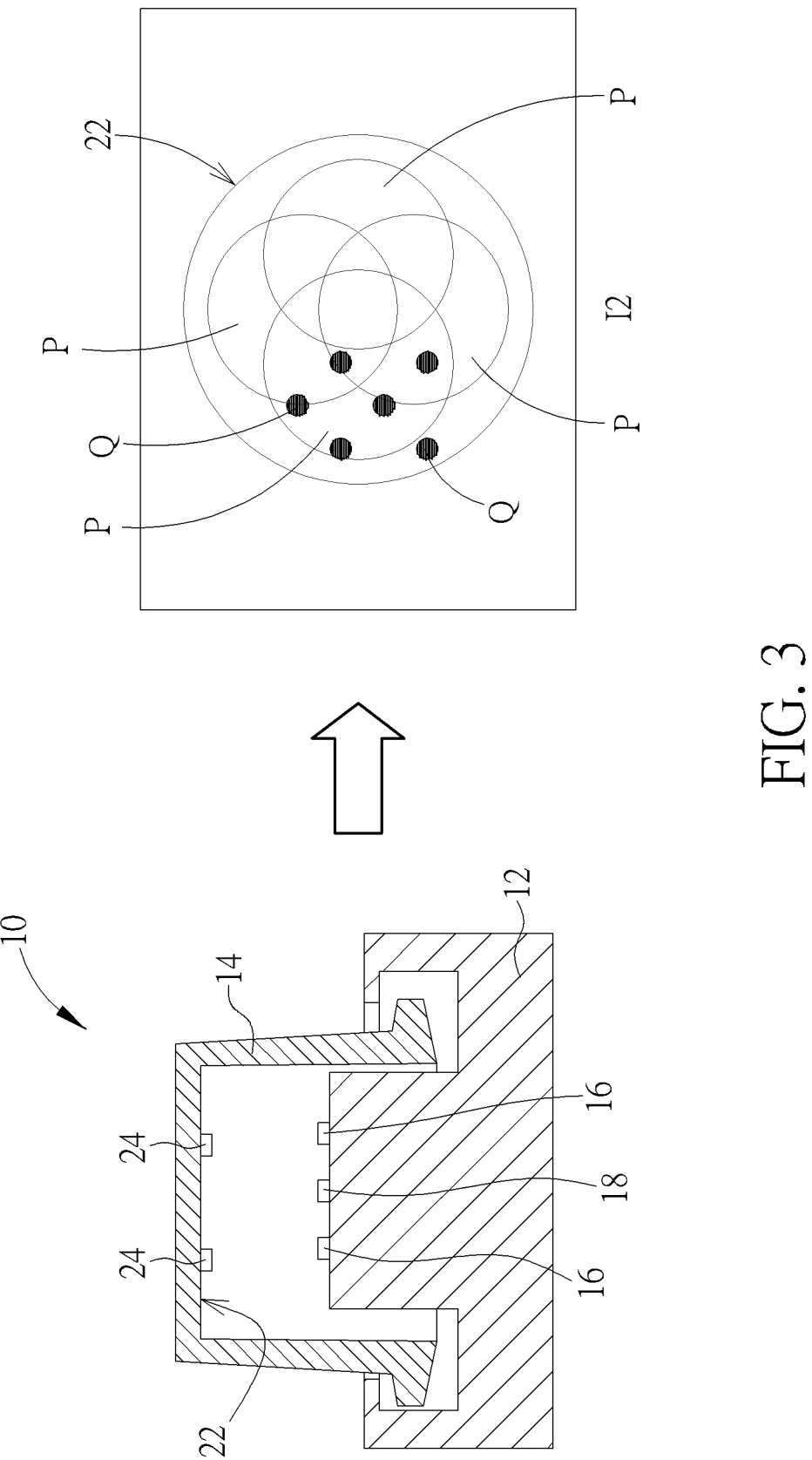
FIG. 3 is a diagram of the joystick in a laterally shifting operation mode according to the first embodiment of the present invention.
Figure 4:
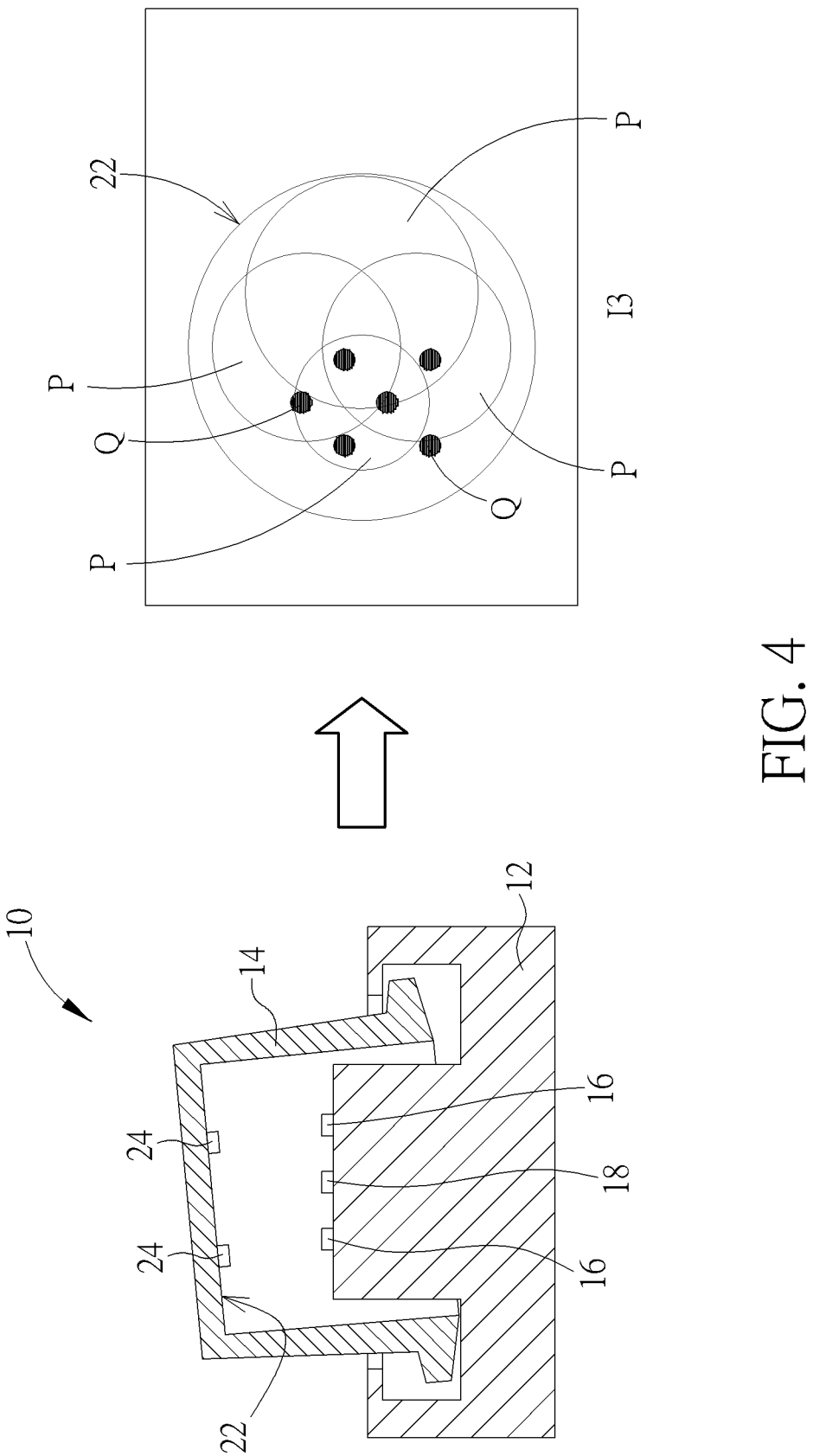
FIG. 4 is a diagram of the joystick in an obliquely pressing operation mode according to the first embodiment of the present invention.
Figure 5:
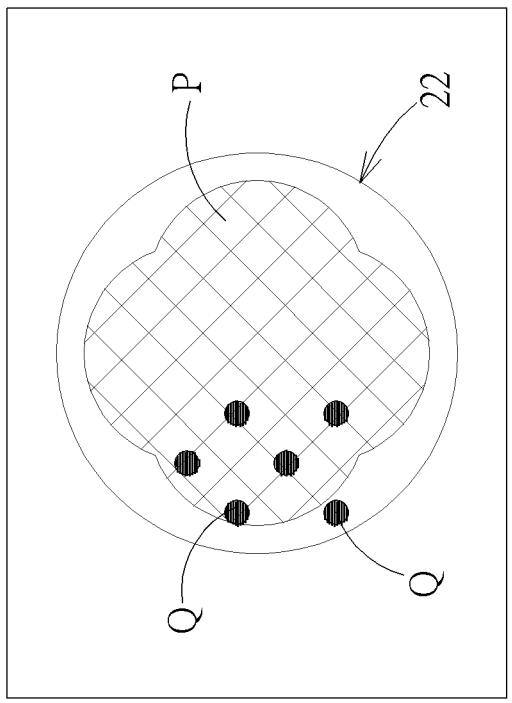
FIG. 5 is a diagram of images showing luminous regions and identification spots according to the first embodiment of the present invention.
Figure 5:
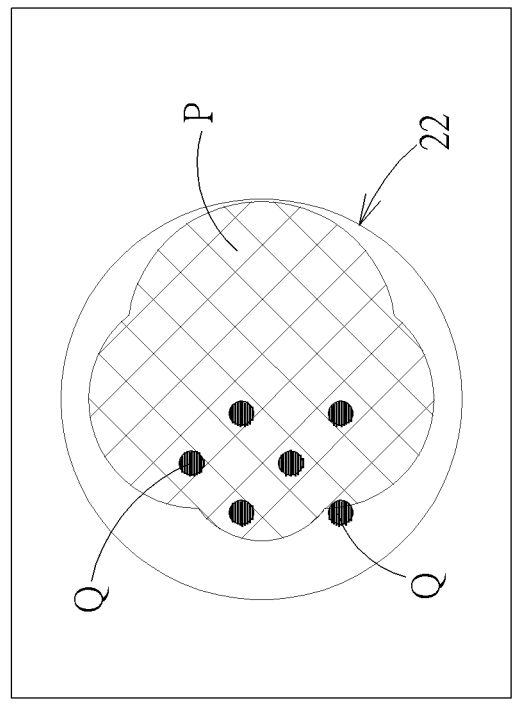
Figure 5:
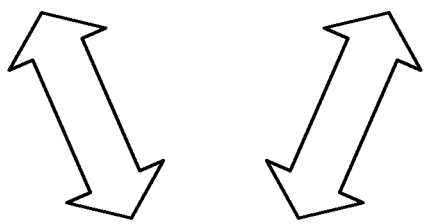
Figure 5:
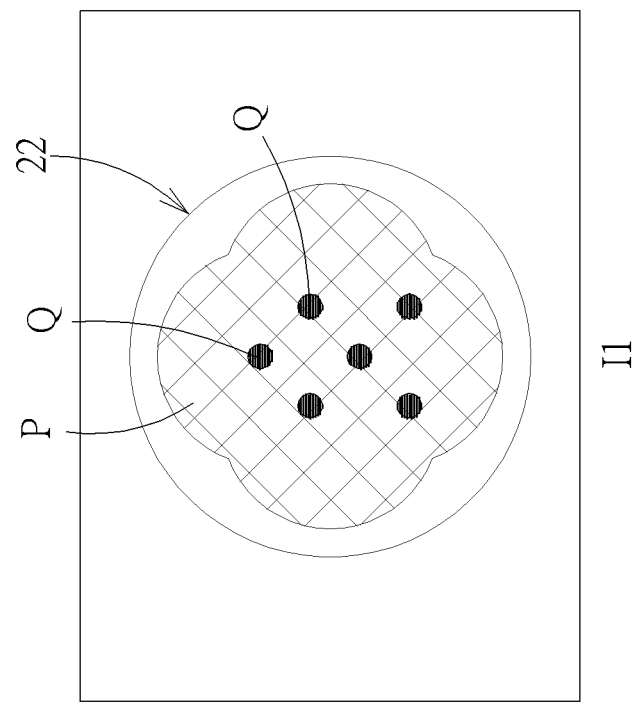
Figure 6:
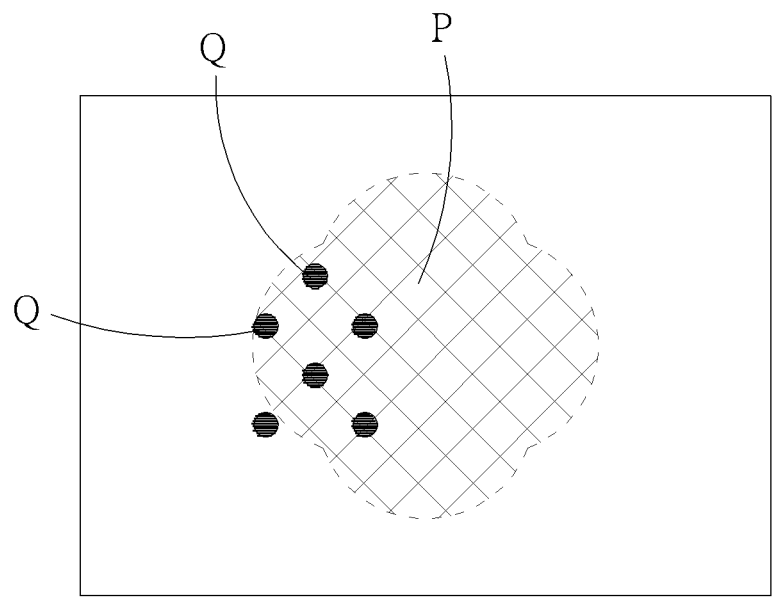
FIG. 6 and FIG. 7 are diagrams of identification images captured by the joystick 10 in the laterally shifting operation according to the first embodiment of the present invention.
Figure 7:
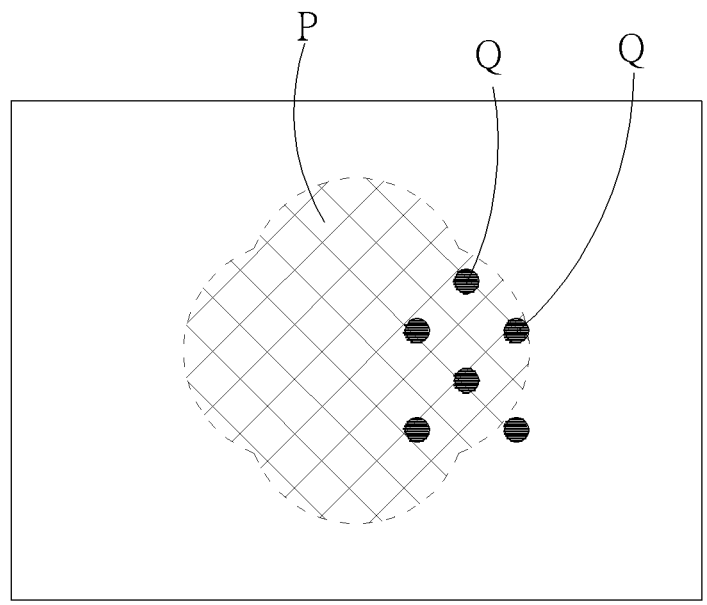
Figure 8:
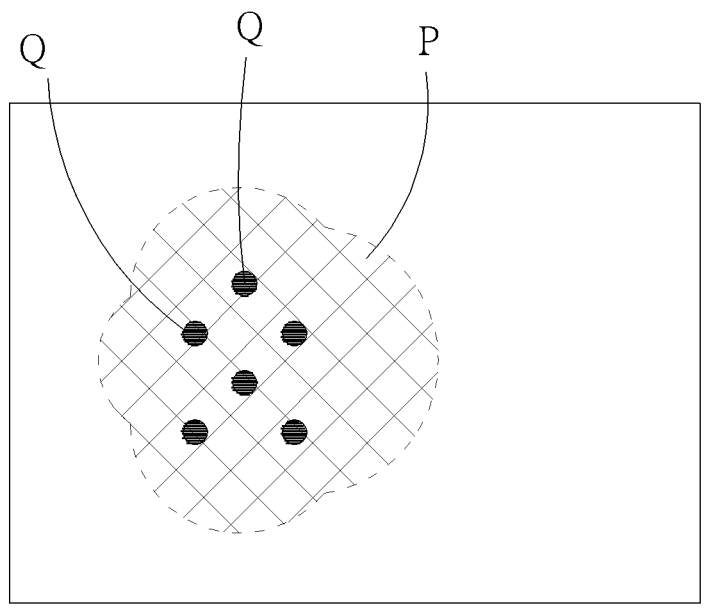
FIG. 8 and FIG. 9 are diagrams of identification images captured by the joystick in the obliquely pressing operation according to the first embodiment of the present invention.
Figure 9:
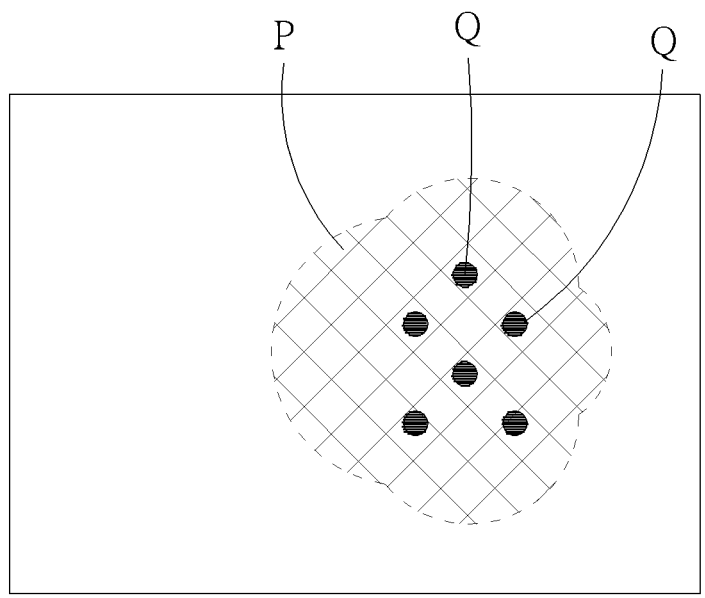

Please refer to FIG. 1 to FIG. 9. FIG. 1 is a diagram of a joystick 10 according to a first embodiment of the present invention. FIG. 2 is a diagram of the joystick 10 in an initial operation mode according to the first embodiment of the present invention. FIG. 3 is a diagram of the joystick 10 in a laterally shifting operation mode according to the first embodiment of the present invention. FIG. 4 is a diagram of the joystick 10 in an obliquely pressing operation mode according to the first embodiment of the present invention. FIG. 5 is a diagram of images showing luminous regions and identification spots according to the first embodiment of the present invention. FIG. 6 and FIG. 7 are diagrams of identification images I1_1 and I1_2 captured by the joystick 10 in the laterally shifting operation according to the first embodiment of the present invention. FIG. 8 and FIG. 9 are diagrams of identification images I2_1 and I2_2 captured by the joystick 10 in the obliquely pressing operation according to the first embodiment of the present invention.

The joystick 10 can include a first structural component 12, a second structural component 14, a light emitter 16, an optical sensor 18 and a processor 20. The first structural component 12 and the second structural component 14 can be movably assembled with each other to form a chamber 21. In the embodiment, the second structural component 14 is disposed above the first structural component 12; however, the first structural component 12 may be disposed inside and covered by the second structural component 14. The first structural component 12 can be separated from the second structural component 14, as shown in FIG. 1; or the first structural component 12 can be integrated with the second structural component 14 as along as the first structural component 12 and the second structural component 14 are able to move relative to each other. The light emitter 16 and the optical sensor 18 can be disposed inside the chamber 21, such as being disposed on an upper surface of the first structural component 12 and electrically connected to the processor 20. The light emitter 16 can be used to illuminate one surface 22 of the second structural component 14. The optical sensor 18 can be used to capture an identification image about the illuminate surface 22. In a possible embodiment of the present invention, the light emitter 16 can be an infrared light source, and accordingly the optical sensor 18 can be an infrared sensor. The processor 20 can analyze intensity distribution of the identification image to determine if the joystick 10 is obliquely pressed or laterally shifted in a relative manner.

In the first embodiment, the first structural component 12 can be a base of the joystick 10 and the second structural component 14 can be a cover of the joystick 10; the cover protects the base and can be pushed, pulled, pressed and twisted in many ways to generate a variety of control commands. In another possible embodiment, the first structural component 12 may be the cover and the second structural component 14 may be the base, which means the light emitter 16, the optical sensor 18 and the processor 20 can be disposed on the cover of the joystick 10 for providing the same function as mentioned above.

The joystick 10 may have several light emitters 16 respectively disposed around the optical sensor 18 for uniformly illuminating the surface 22 or projecting some luminous regions onto the surface 22. The plurality of light emitters 16 may emit lights in different wavelength, and so the optical sensor 18 can easily identify different luminous region by colors of the luminous region formed in the captured image. Arrangement of the light emitters 16 may project light onto the surface 22 to form at least one luminous region P. A plurality of luminous regions P emitted by the light emitters 16 may be partly overlapped, and each luminous region P may vary its dimension and position in accordance with motion between the first structural component 12 and the second structural component 14. In addition, a plurality of identification elements 24 can be formed on the surface 22 of the second structural component 14 as identification spots Q. The plurality of identification spots Q can be viewed as dark identification spots or luminous identification spots within the identification image.

When the surface 22 is moved along a direction perpendicular to the normal direction of the optical sensor 18 (i.e. the joystick 10 is shifted), positions of the identifications spots Q in the captured image will change accordingly but positions of the luminous regions P in the captured image are not changed. As shown in FIG. 5, images about the illuminated surface 22 containing the luminous regions P and the identification spots Q can be analyzed to determine if the joystick 10 is obliquely pressed or laterally shifted in the relative manner, and a state of the identification spots Q can be analyzed to determine a moving direction of the obliquely pressing operation or the laterally shifting operation.

The luminous region P and the identification spot Q can be differentiated via a specific quality of the captured image. When the identification element 24 is made by material capable for absorbing the lights emitted from the light emitter 16, some pixels within the captured image having intensity larger than an intensity threshold and having an amount greater than an amount threshold can be represented as the luminous region P, and other pixels within the captured image having intensity ranged in an intensity scope and having an amount in an amount scope can be represented as the identification spot Q. For example, the intensity of the pixels larger than gray level 200 can be set as the luminous region P, and the pixels having the intensity ranged from gray level 30 to gray level 50 and having the amount scope between 2-15 can be set as the identification spot Q. The identification element 24 is used to magnify intensity difference between the luminous region P and the identification spot Q.

In addition, the joystick 10 may switch the light emitter 16 to alternately emit the light with different wavelengths for differentiating the luminous region P and the identification spot Q. For a start, the light emitter 16 can emit the light having a first wavelength, such as the red light, and the optical sensor 18 receives the red light image, therefore the luminous region P can be identified. Then, the light emitter 16 can be switched to emit the light having a second wavelength, such as the blue light, and the identification element 24 is made by the material capable of absorbing the blue light, so the optical sensor 18 can capture the image showing the dark identification spot Q but without interference of the luminous region P.

When the joystick 10 is not pressed and shifted, the luminous regions P emitted by the light emitters 16 may be projected onto an area within an identification image I1 captured by the optical sensor 18, and the identification spots Q can be located on a middle of the area, as shown in FIG. 2. In one embodiment, the luminous regions P and the identification spots Q can be gathered in a middle area within the identification image I1. When the joystick 10 is laterally shifted, the illuminated surface 22 may be moved parallel to the light emitters 16 and the optical sensor 18; the luminous regions P may have similar dimensions or be enlarged or reduced slightly, and will not have a significant movement, and the identification spots Q can be shifted according to a movement of the illuminated surface 22, as the identification image I2 shown in FIG. 3. Comparing the identification image I2 with the identification image I1, distribution of the luminous regions P inside the identification image I2 may be similar to distribution of the luminous regions P inside the identification image I1, and distribution of the identification spots Q inside the identification image I2 can be different from distribution of the identification spots Q inside the identification image I1, so that the processor 20 can identify the joystick 10 is laterally shifted by analyzing the distribution of the identification spots Q. A capturing pattern of the luminous regions P of the illuminated surface 22 (such as a circular form within the identification images I1, I2, and I3) in the captured images are nearly motionless no matter what direction the joystick 10 is laterally shifted.

As shown in FIG. 4, the user may push an edge of the second structural component 14 to obliquely press the joystick, and the luminous regions P may be partly enlarged and partly reduced because the illuminated surface 22 is tilted relative to the light emitters 16 and the optical sensor 18. For example, as the identification image I3 shown in FIG. 4, the left-side luminous region P may be smaller than the right-side luminous regions P when a left-edge of the second structural component 14 is pressed and close to the first structural component 12. Comparing the identification image I3 with the identification images I1 and I2, distribution of the identification spots Q inside the identification image I3 is different from distribution of the identification spots Q inside the identification image I1 but similar to distribution of the identification spots Q inside the identification image I2, and distribution of the luminous regions P inside the identification image I3 is different from distribution of the luminous regions P inside the identification images I1 and I2, therefore, the processor can identify the joystick 10 is obliquely pressed via analysis of the distribution of the identification spots Q and the variation of the luminous regions P.

At least one of position change, brightness change and shape change of the luminous regions P on the illuminated surface 22 can be analyzed for determining if the joystick 10 is obliquely pressed. The distribution of the identification spots Q (which corresponds to the state of the plurality of identification elements 24) can be captured by the optical sensor 18 and used to determine a category, a direction and a scale of motion between the first structural component 12 and the second structural component 14; however, distribution variation of the identification spots Q resulted from the laterally-shifted joystick 10 is similar to the distribution variation of the identification spots Q resulted from the obliquely pressed joystick 10, therefore the position change or the shape change of the luminous regions P (which corresponds to the intensity distribution of the illuminated surface 22) can be used to distinguish the laterally shifting operation from the obliquely pressing operation. A slanting check design pattern shown in FIG. 5 to FIG. 9 is represented as diffuse glow (such as a high-illumination pattern) formed by the luminous regions P. As the embodiment shown in FIG. 6 and FIG. 7, the identification spots Q are moved in accordance with motion of the joystick 10, and the slanting check design pattern (which means an assembly of the luminous regions P) is motionless and not deformed so the joystick 10 is determined as being laterally shifted. As the embodiment shown in FIG. 8 and FIG. 9, the identification spots Q are moved in accordance with the motion of the joystick 10, and the slanting check design pattern (which means the assembly of the luminous regions P) is moved and deformed, then the joystick 10 can be determined as being obliquely pressed.

The processor 20 can analyze the position change of the above-mentioned slanting check design pattern to identify if the joystick 10 is obliquely pressed or laterally shifted and then generate a plurality of candidate control commands. If the intensity distribution of the illuminated surface 22 conforms to a predefined condition, such as the slanting check design pattern containing the luminous regions P being motionless, the plurality of candidate control commands can be generated as possible operation of laterally shifting in a right direction, in a left direction, in an upper direction and in a lower direction; then, the state of the identification elements 24 can be changed and detected as the slanting check design pattern is motionless, so that the processor 20 can analyze the distribution variation of the identification spots Q within the image to select a final control command from the plurality of candidate control commands. For example, the final control command about the identification image I1_1 shown in FIG. 6 can be represented as the operation of laterally shifting toward the left direction, and the final control command about the identification image I1_2 shown in FIG. 7 can be represented as the operation of laterally shifting toward the right direction.

If the intensity distribution of the illuminated surface 22 does not conform to the predefined condition, such as the slanting check design pattern containing the luminous regions P being moved and/or deformed, the plurality of candidate control commands can be generated as the possible operation of obliquely pressing in the right direction, in the left direction, in the upper direction and in the lower direction. Because the state of the identification elements 24 is changed and detected as the slanting check design pattern is moved and/or deformed, the processor 20 can analyze the distribution variation of the identification spots Q within the image to select the final control command from the plurality of candidate control commands. For instance, the final control command about the identification image I2_1 shown in FIG. 8 can be represented as operation of obliquely pressing the left-side edge, and the final control command about the identification image I2_2 shown in FIG. 9 can be represented as operation of obliquely pressing the right-side edge.

Figure 10:
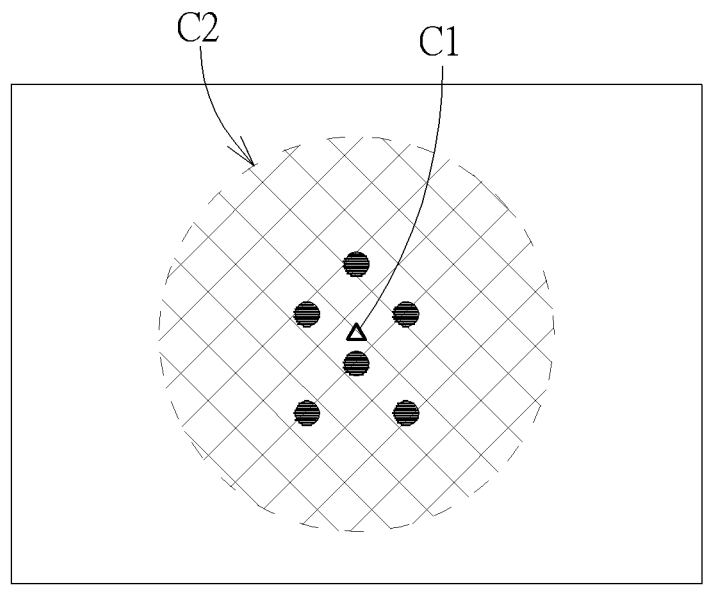
FIG. 10 is a diagram of an identification image according to the first embodiment of the present invention.

Please refer to FIG. 10. FIG. 10 is a diagram of an identification image I according to the first embodiment of the present invention. A specific point C1 can be generated in the slanting check design pattern, and a virtual boundary C2 can be generated according to position of the specific point C1. The specific point C1 may be a median point or a gravity center of the slanting check design pattern, and the virtual boundary C2 may be a circumference based on the specific point C1. If the joystick 10 is laterally shifted, the specific point C1 can stay around a center of the virtual boundary C2 because the first structural component 12 is not tilted. If the joystick 10 is obliquely pressed, the specific point C1 may move close to or across the virtual boundary C2 because the first structural component 12 is tilted. Therefore, the optical sensor 18 can capture a series of identification images I; the processor 20 can determine the first structural component 12 and the second structural component 14 are obliquely pressed when the high-illumination region of the slanting check design pattern is moved over a predefined range. The processor 20 can set one previous identification image from the series of identification images I as a reference image, and compare the specific point C1 within a current identification image to the virtual boundary C2 within the previous identification image, for deciding if the specific point C1 is moved over or moved inside the predefined range. The specific point C1 staying around the center of the virtual boundary C2 can represent the joystick 10 is laterally shifted, and the specific point C1 distant from the center of the virtual boundary C2 or moved over the virtual boundary C2 can represent the joystick 10 is obliquely pressed.

Figure 11:
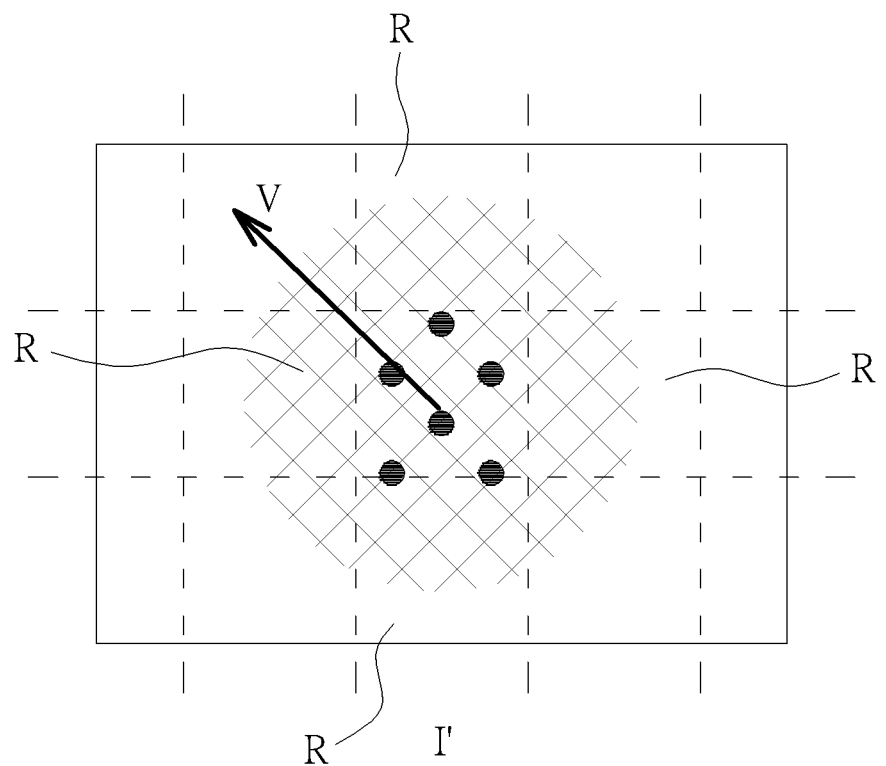
FIG. 11 is a diagram of an identification image according to the first embodiment of the present invention.

Please refer to FIG. 11. FIG. 11 is a diagram of an identification image I' according to the first embodiment of the present invention. The identification image I' can be divided into a plurality of regions R. Each region R may contain one or several pixels and has an individual pixel average intensity. The processor 20 can compute mean intensity of each region R, and compare the mean intensity of each region R in a current image with mean intensity of a corresponding region R in a background image, for generating a motion vector V of pointing out a movement of the slanting check design pattern (which corresponds to the diffuse glow or the high-illumination pattern of the luminous regions P). The background image can be a previous image or a pre-stored reference image. For example, if the slanting check design pattern is moved toward the upper left, mean intensity variation in the upper-side region R between the current image and the background image may be greater than mean intensity variation in the lower-side region R between the current image and the background image, and mean intensity variation in the left-side region R between the current image and the background image may be greater than mean intensity variation in the right-side region R between the current image and the background image, so that the motion vector V can be generated as shown in FIG. 10 for indicating that an upper left corner of the joystick 10 is obliquely pressed. A length of the motion vector V may correspond to a difference between the mean intensity variation in the upper-side region R and the lower-side region R, and a difference between the mean intensity variation in the left-side region R and the right-side region R. The length of the motion vector V may be represented as a quantity of force applied to the obliquely-pressed joystick 10.

Figure 12:
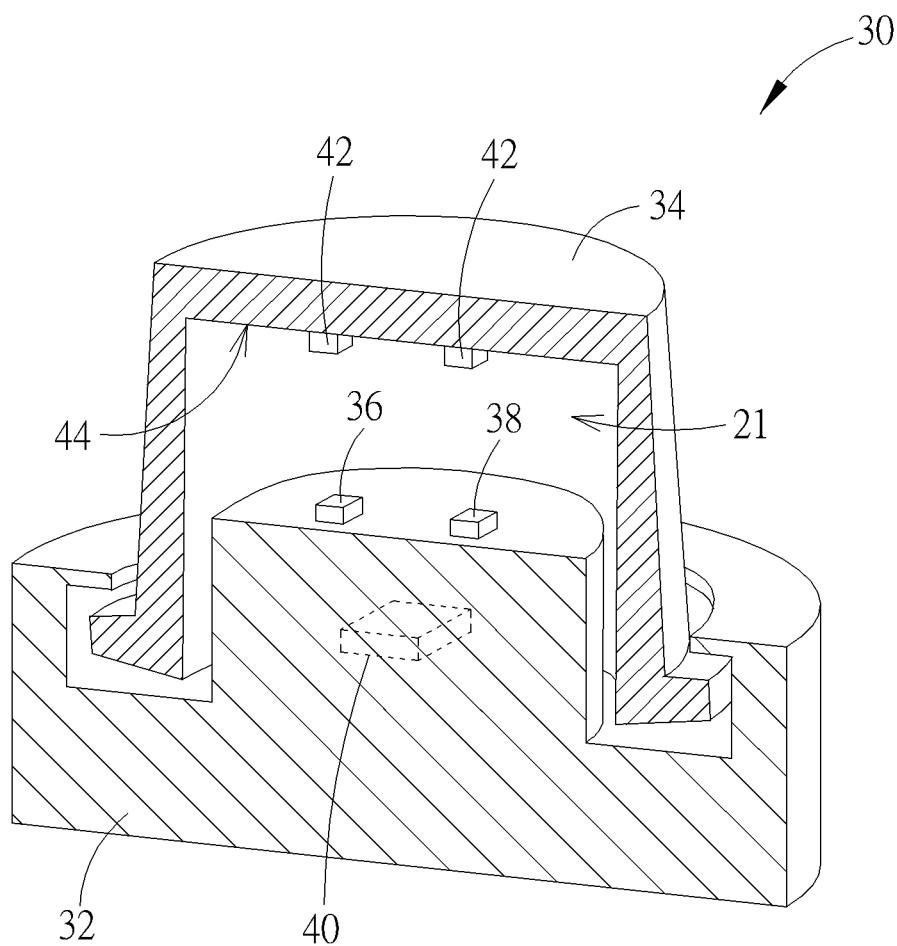
FIG. 12 is a diagram of the joystick according to a second embodiment of the present invention.
Figure 13:
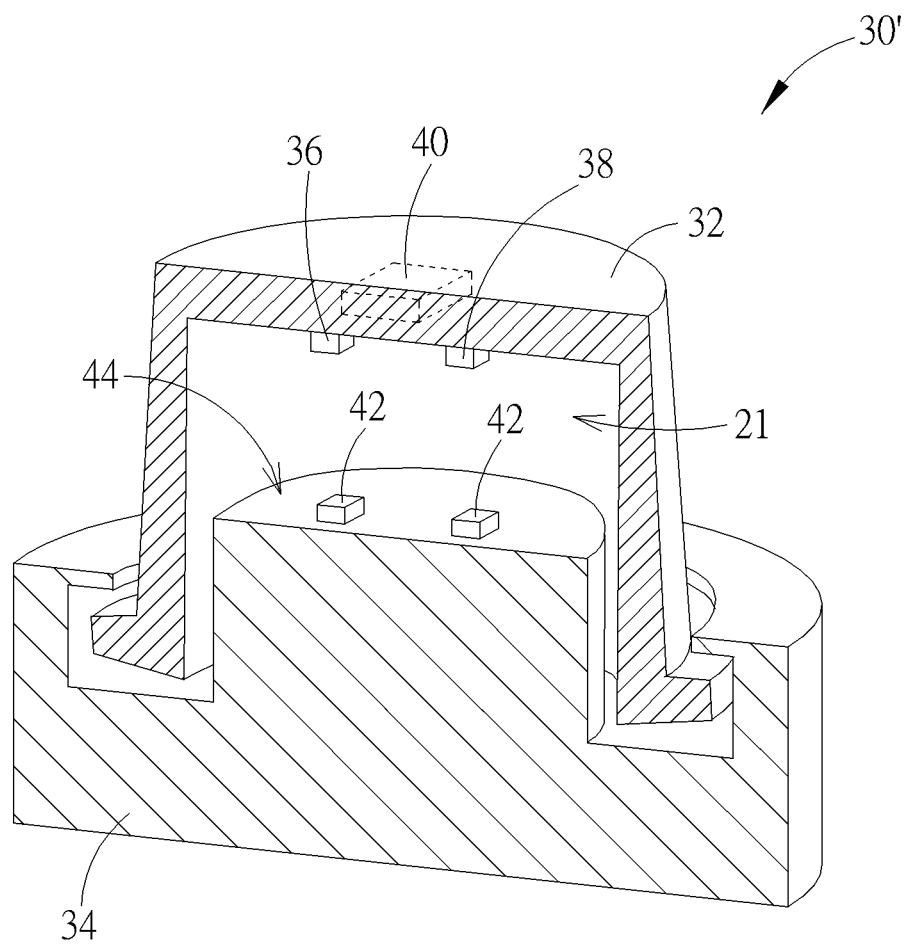
FIG. 13 is a diagram of the joystick according to a third embodiment of the present invention.

Please refer to FIG. 12 and FIG. 13. FIG. 12 is a diagram of a joystick 30 according to a second embodiment of the present invention. FIG. 13 is a diagram of a joystick 30' according to a third embodiment of the present invention. The joystick 30 and the joystick 30' can respectively include a first structural component 32, a second structural component 34, an optical sensor 36, a light emitter 38 and a processor 40. The second structural component 34 has several identification elements 42, and can be movably assembled with the first structural component 32. The optical sensor 36 and the light emitter 38 can be disposed inside the chamber 21 and electrically connected to the processor 40. The light emitter 38 can be used to illuminate one surface 44 of the second structural component 34. The optical sensor 36 can be used to acquire a state of the identification elements 42. The processor 40 can analyze the state of the identification element for generating the control signal.

In the second embodiment, the first structural component 32 is the base of the joystick, and the second structural component 34 is the cover of the joystick; the second structural component 34 can be pressed, pushed and pulled by the user to move relative to the first structural component 32. In the third embodiment, the first structural component 32 is the cover of the joystick, and the second structural component 34 is the base of the joystick; the first structural component 32 can be pressed, pushed and pulled by the user to move relative to the second structural component 34. Besides, the first structural component 32 and the second structural component 34 can be made by rigid material.

In conclusion, the joystick of the present invention can preset the luminous regions projected onto the illuminated surface, and analyze the intensity distribution of the illuminated surface, which can be affected by the distribution variation of the luminous regions, for determining whether the joystick is obliquely pressed or laterally shifted in the relative manner. Arrangement of the light emitter is predefined; the light emitter of the joystick not only can illuminate the identification elements therefore the optical sensor can capture the clear image about the identification spots, but also can project the luminous regions for distinguishing the laterally shifting operation from the obliquely pressing operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A joystick, comprising:
   a first structural component;
   a second structural component assembled with the first structural component to form a chamber, the second structural component being obliquely pressed or laterally shifted relative to the first structural component;
   a light emitter disposed inside the chamber for projecting light onto a luminous region of one surface of the second structural component to form a high-illumination pattern, wherein position of the high-illumination pattern is unchanged when the second structural component is laterally shifted relative to the first structural component and is further changed when the second structural component is obliquely pressed;
   an optical sensor disposed inside the chamber for capturing the surface of the second structural component; and
   a processor electrically connected to the optical sensor and adapted to analyze position change of the high-illumination pattern to distinguish lateral motion or oblique motion of the joystick.

2. The joystick of claim 1, wherein at least one of the position change, brightness change and shape change of the high-illumination pattern is analyzed for determining when the joystick is obliquely pressed.

3. The joystick of claim 1, wherein the first structural component and the second structural component are represented as being obliquely pressed when the high-illumination pattern is moved over a predefined range.

4. The joystick of claim 3, wherein a specific point of the high-illumination pattern and a virtual boundary around the specific point are generated, the first structural component and the second structural component are represented as being obliquely pressed when utilizing the virtual boundary to decide the specific point is moved over the predefined range.

5. The joystick of claim 4, wherein the processor analyzes a state of identification spots formed on the second structural component, and the first structural component and the second structural component are laterally shifted when utilizing the virtual boundary to decide the specific point is moved inside the predefined range and the identification spots are shifted.

6. The joystick of claim 4, wherein a series of identification images is captured by the optical sensor, the processor compares the specific point of the high-illumination pattern within a current identification image to the virtual boundary within a previous identification image for determining the first structural component and the second structural component are obliquely pressed or laterally shifted.

7. The joystick of claim 4, wherein the specific point is a median point or a gravity center of the high-illumination pattern.

8. The joystick of claim 1, wherein an identification element is formed on the second structural component, the processor is adapted to analyze a state of the identification element captured by the optical sensor for determining a category, a direction and a scale of motion between the first structural component and the second structural component.

9. The joystick of claim 8, wherein the first structural component and the second structural component are obliquely pressed when the state is changed and intensity distribution of the surface conforms to a predefined condition, and are further laterally shifted when the state is changed and the intensity distribution does not conform to the predefined condition.

10. The joystick of claim 1, wherein an identification image captured by the optical sensor is divided into a plurality of regions, the processor is adapted to analyze intensity variation between each region in the identification image and a corresponding region in a background image for determining a motion vector of the surface.

11. The joystick of claim 1, wherein the first structural component is a section of the second structural component.

12. The joystick of claim 1, wherein the processor analyzes the luminous region on the surface to determine oblique movement of the second structural component, and analyzes a plurality of identification spots on the surface to determine a level movement of the second structural component.

* * * * *